Patented Dec. 7, 1943

2,336,318

UNITED STATES PATENT OFFICE 2,336,318

BETA-NITROALKYL ESTER OF ALPHA-HYDROXYISOBUTYRIC ACIDS

Jack T. Thurston, Cos Cob, and Donald W. Kaiser, Springdale, Conn., assignors to American Cyanamid Company, New York, N. Y., a corporation of Maine No Drawing. Application November 6, 1940, Serial No. 364,555

1 Claim. (Cl. 260—484)

The present invention relates to a new class of chemical compounds comprising the 2-nitro-2-methyl-1-propanol ester of alpha-hydroxyisobutyric acid and the hydroxy substituted derivatives thereof. The new compounds of this invention may be represented by the following formula:

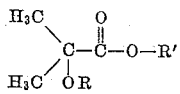

in which R may be hydrogen or an aliphatic, cycloaliphatic, aromatic, heterocyclic, acyl radical or an alkali metal and R' is

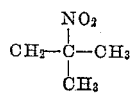

The esters of the present invention may be prepared by any of the methods ordinarily employed in the production of esters and the invention is not intended to be limited by any particular method for producing. We have found, however, that best results are obtained when the 2-nitro-2-methyl-1-propanol is reacted directly with alpha-hydroxyisobutyric acid or a hydroxy substituted derivative at elevated temperatures in the presence of a catalyst such as sulfuric acid or toluenesulfonic acid.

As an illustration of the procedure in accordance with the method of this invention for the production, for example, of the 2-nitro-2-methyl-1-propyl-alpha-hydroxyisobutyrate a mixture of 59.5 g. (0.5 mol) of 2-nitro-2-methyl-1-propanol, 62.5 g. (0.6 mol) of alpha-hydroxyisobutyric acid, 3 drops of concentrated sulfuric acid, and 260 g. (2.84 mols) of dry toluene were placed in a flask which was attached to a moisture trap equipped with a condenser. This reaction mixture was refluxed for 16 hours during which time a total of 11.3 cc. (0.64 mol) of water was obtained. The brown-colored toluene solution was washed with water to remove any starting materials and the toluene solution dried over sodium sulfate. After removal of the toluene under reduced pressure, 52 g. representing a 51% yield of colorless liquid, boiling at 96-97° C./1 mm. was obtained.

In the above example the alpha-hydroxyisobutyric acid may be replaced in all or part by a hydroxy substituted derivative to produce the corresponding 2-nitro-2-methyl-1-propyl ester. Suitable hydroxy substituted compounds include those in which R of the general formula is an alkyl radical such as ethyl, or a cycloaliphatic radical such as cyclohexyl, an aromatic radical such as benzene, a heterocyclic radical such as pyridine, or an alkali metal, and especially acyl radicals such as acetyl or carbethoxy radicals.

When compounds are to be produced in which the hydrogen of the hydroxyl group is replaced by some other radical, it may be desirable in some instances to produce the 2-nitro-2-methyl-1-propyl ester first, and then replace the hydrogen of the hydroxy group with an organic radical such as for example, an acyl radical, and in other cases it may be desirable to replace the hydrogen of the hydroxyl group with an acyl group prior to the production of the ester.

Among the various acyl radicals that can be used to replace the hydrogen of the hydroxyl group are the aliphatic acyl radicals such as formyl, acetyl, propionyl, butyryl, octanoyl and carbonic.

The acyl radical may also be that of a cycloaliphatic acid such as cyclohexyl acetic acid, camphoric acid, and the like. The acyl radical may likewise be an aromatic radical such as those of benzoic acid or salicylic acid. Dicarboxylic acids may also be used to acylate the hydroxyl groups in which case two molecules of alpha-hydroxyisobutyric acid are combined with one molecule of the dicarboxylic acid, or the mono-esters of the dicarboxylic acids may be employed in which case one molecule of alpha-hydroxyisobutyric acid will combine with one molecule of the monoester of the dicarboxylic acid. Among the various dicarboxylic acids and mono-esters which can be used are those such as succinic, oxalic, diglycolic, sebacic, maleic, naphthalene dicarboxylic, phthalic, chlorophthalic, nitrophthalic, and the like. Ether-acids may also be employed to produce acylated 2-nitro-2-methyl-1-propyl esters of alpha-hydroxyisobutyric acid in which case R in the general formula represents the radical of an ether-acid such as:

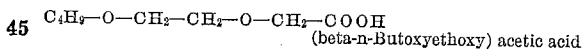
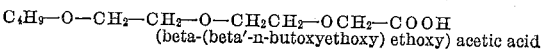
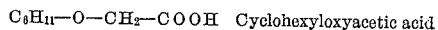
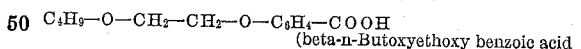
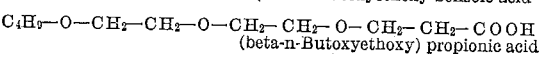

The hydrogen of the hydroxyl group may also be replaced by heterocyclic acids under certain conditions such as for example the radical of nicotinic acid.

As pointed out heretofore, the hydrogen on the hydroxyl group may be replaced by an acyl radical either prior to the production of the 2-nitro-2-methyl-1-propyl ester of alpha-hydroxyisobutyric acid or the ester may be prepared first and then the hydroxyl group acylated. In most cases the acid halides may be used to replace the hydrogen of the hydroxyl groups as for example, acetyl chloride may be used to produce alpha acetylated esters or acids.

Ethers of the 2-nitro-2-methyl-1-propyl esters of alpha-hydroxyisobutyric acid are produced when the hydrogen of the hydroxyl group is replaced by either an alkyl, cycloaliphatic, aralkyl, or aryl group and such ether-esters have properties differing somewhat from the esters themselves. The alkyl radicals used to replace the hydrogen may be either saturated or unsaturated and may or may not contain substituent groups. Included in this group of alkyl radicals are the methyl, ethyl, propyl, butyl, isobutyl, octyl, as well as the alkyl radicals containing carboxylic and oxy groups in the chain to produce such compounds as the following:

$(CH_3)_2.C[O.CH_2CH(CH_3)_2]COOR'$,
$R'.O_2C.CH(CH_3).O.C(CH_3)_2.CO_2.R'$,
$R'.O_2C.C(CH_3)_2.O.CH_2.CH_2.O.CH_2.CH_2.O.C(CH_3)_2.CO_2.R'$

The hydrogen may also be replaced by alicyclic radicals such as cyclohexanyl, methyl cyclohexanyl, etc.

The various aralkyl radicals may be also used to replace the hydrogen such as benzyl, phenylethyl, phenylpropyl, naphthylmethyl, diphenylmethyl, diphenylethyl, cinnamyl, etc.

Various metal radicals may be used to replace the hydrogen on the hydroxyl group of the esters and particularly active metals such as the alkali metals sodium and potassium. These salts are produced by adding sodium or potassium to the 2-nitro-2-methyl-1-propyl ester of alpha-hydroxyisobutyric acid in an inert solvent and refluxing. In some cases it is more desirable to prepare the sodium and potassium salts by reacting the 2-nitro-2-methyl-1-propyl alpha-hydroxyisobutyrate with the metallic alkoxide in an inert solvent such as toluene and remove the alcohol by distillation.

The hydrogen of the hydroxyl group may be replaced by any of the aliphatic or aromatic radicals mentioned above by reacting the sodium salt of the 2-nitro-2-methyl-1-propyl ester of alpha-hydroxyisobutyric acid with the desired aliphatic or aromatic halides or sulfates.

The hydrogen of the hydroxyl group of the 2-nitro-2-methyl-1-propyl alpha-hydroxyisobutyric acid may also be replaced by groups possessing ketones or aldehyde radicals. For example, halogenated ketones may be reacted with the sodium salt of the 2-nitro-2-methyl-1-propyl ester of alpha-hydroxyisobutyric acid to split off sodium chloride and substitute the ketone radical in place of the hydrogen of the hydroxyl group. For example, when chloroacetone is reacted as described above the following compound is produced:

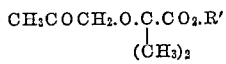

The corresponding aromatic ketones may be used instead of acetone. When chlorinated aldehydes are employed the aldehyde radical replaces the hydrogen in the hydroxyl group.

The carbonic acid esters of the 2-nitro-2-methyl-1-propyl esters of alpha-hydroxyisobutyric acid can be prepared by reacting the 2-nitro-2-methyl-1-propyl ester with, for example, ethyl chloroformate to produce the alpha-carbethoxy aromatic ester.

As is now apparent the new compounds of the present invention are the 2-nitro-2-methyl-1-propyl esters of the alpha-hydroxyisobutyric acid or the various hydroxy substituted derivatives thereof. These new compounds have a wide field of usefulness in the commercial arts and particularly as solvents for nitrocellulose, cellulose acetate, lacquers and various coating compositions. Many of these compounds are also useful as plasticizers and modifiers for synthetic resins and similar compositions.

The above description and examples are intended to be illustrative only. Any modification of or variation therefrom in conformity with the spirit of the invention is intended to be included within the scope of the claim.

We claim:

The compound having the following formula:

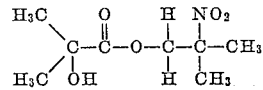

JACK T. THURSTON.
DONALD W. KAISER.